M. D., E. C. & A. WELLS.
Hand Seeder.
No. 57,604.
Patented Aug. 28, 1866.
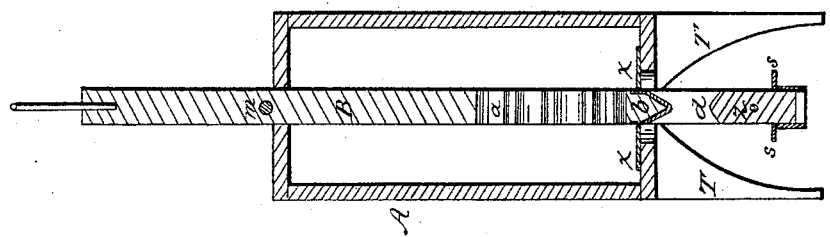
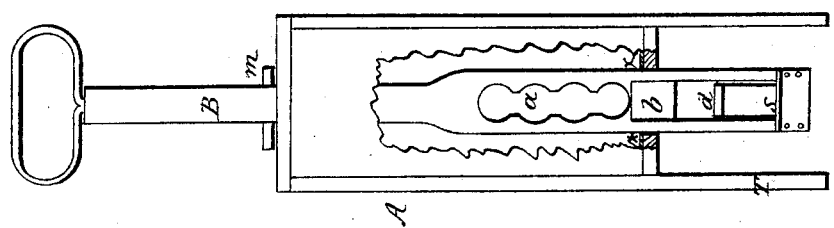
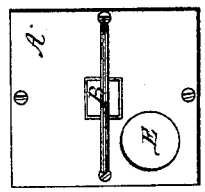
Inventor:
Witnesses:

UNITED STATES PATENT OFFICE.

M. D. WELLS, E. C. WELLS, AND A. WELLS, OF MORGANTOWN, W. VA.

IMPROVEMENT IN SEED-DISTRIBUTERS.

Specification forming part of Letters Patent No. 57,604, dated August 28, 1866.

*To all whom it may concern:*

Be it known that we, M. D. WELLS, E. C. WELLS, and A. WELLS, of Morgantown, in the county of Monongalia and State of West Virginia, have invented certain new and useful Improvements in Seed-Distributers; and we do hereby declare that the following is a full, clear, and exact description of the same, reference being had to the accompanying drawings and the letters of reference marked thereon, making a part of this specification.

A represents an oblong wooden box, which is provided with legs T at its end, and has a vertical shaft, B, passing through the center. This shaft has a slot, $a$, or its equivalent, made in that part of it which is within the box, and a V-shaped block of metal, $b$, just below the end of the slot $a$.

$d$ represents a wooden strip, which is set in an opening at the end of the shaft, and therein secured by means of a set-screw, $z$. This strip is made convex at the top, and placed at a suitable distance from the V-shaped block $b$ to allow the seed to pass between them. The block $d$ can be raised or lowered by means of its set-screw $z$ to suit the size of the seed.

$s\ s$ represent two metallic flanges, which are attached to the end of the shaft, and are for the purpose of keeping said shaft from being drawn through the box, as well as acting as valves, as will be hereinafter set forth.

$x\ x$ represent two pieces of india-rubber, which are fastened on the inner side of the bottom of box A, and cover the small opening made in said box at the side of the opening through which the shaft passes. $m$ is a pin, which passes through the shaft to prevent said shaft from going too far into the box.

In the operation of this device the corn or other seed is placed within the opening E at the top of the box, and shaft B is made about the length of an ordinary walking-cane. When the box is suspended by the handle at the top of the shaft the flanges $s\ s$ completely cover the openings in the bottom of the box, and the grain is prevented from passing out. The operator passes to the point he desires to drop the grain, when he plants the feet of the box on the ground, and the grain is forced past the india-rubber and through the opening by means of the block $b$, when it falls upon the convexity of the block $d$ and is separated. The operator then raises the shaft and carries the distributer to the next point, when he again drops it and plants the seed.

It will be seen that the pin $m$ prevents the shaft from passing too far into the box, and merely allows the point of the block $b$ to extend below the bottom of the box, while the slot $a$ agitates the grain and keeps the receiver filled.

Having thus fully described our invention, what we claim as new, and desire to secure by Letters Patent, is—

The box A, constructed as described, the shaft B, provided with the slot $a$ or its equivalent, block $b$, strip $d$, and flanges $s\ s$, the whole constructed, arranged, and operating substantially as herein set forth.

As evidence that we claim the foregoing we have hereunto set our hands in the presence of two witnesses.

M. D. WELLS.
E. C. WELLS.
A. WELLS.

Witnesses:
  E. C. LAZIER,
  ALBERT LAZIER.